and coupled to the frame. The lens includes first and second (12) United States Patent
Waltermann et al.

(10) Patent No.: US 10,048,514 B2
(45) Date of Patent: Aug. 14, 2018

(54) EYE GLASSES WITH POLARIZERS FOR CONTROLLING LIGHT PASSING THROUGH AT LEAST ONE LENS OF THE EYE GLASSES

(71) Applicant: Lenovo (Singapore) Pte. Ltd., New Tech Park (SG)

(72) Inventors: Rod D. Waltermann, Rougemont, NC (US); Russell Speight VanBlon, Raleigh, NC (US); John Carl Mese, Cary, NC (US); Nathan J. Peterson, Oxford, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1 day.

(21) Appl. No.: 15/370,383

(22) Filed: Dec. 6, 2016

(65) Prior Publication Data

US 2018/0157066 A1    Jun. 7, 2018

(51) Int. Cl.
| | | |
|---|---|---|
| *G02C 7/10* | (2006.01) | |
| *G02C 7/12* | (2006.01) | |
| *G02F 1/1335* | (2006.01) | |
| *G02F 1/133* | (2006.01) | |
| *G02B 27/28* | (2006.01) | |
| *G02B 27/00* | (2006.01) | |

(52) U.S. Cl.
CPC ......... *G02C 7/101* (2013.01); *G02B 27/0093* (2013.01); *G02B 27/281* (2013.01); *G02C 7/12* (2013.01); *G02F 1/13318* (2013.01); *G02F 1/133528* (2013.01); *G02C 2202/18* (2013.01)

(58) Field of Classification Search
CPC .. G02B 27/0093; G02B 27/281; G02C 7/101; G02C 7/12; G02C 2202/18; G02F 1/133528; G02F 1/13318
USPC .................. 351/44, 41; 345/38, 50; 359/630
See application file for complete search history.

(56) References Cited

U.S. PATENT DOCUMENTS 9,323,053 B2 *  4/2016  Lam ..................... G02B 27/017
9,606,361 B2 *  3/2017  Yang .................. G02B 27/0172

OTHER PUBLICATIONS

Matt Hirsch, "Polarization Fields: Dynamic Light Field Display Using Multi-Layer LCDs", Youtube video, uploaded Dec. 4, 2011, https://www.youtube.com/watch?v=mt3qBPENpno.

* cited by examiner

*Primary Examiner* — Tuyen Tra
(74) *Attorney, Agent, or Firm* — John L. Rogitz; John M. Rogitz (57) ABSTRACT

In one aspect, glasses include a frame, a processor coupled to the frame, and a lens accessible to the processor and coupled to the frame. The lens includes first and second polarizers and a first liquid crystal unit juxtaposed between the first and second polarizers, with the lens including plural liquid crystal units controllable by the processor. The glasses also include a camera accessible to the processor and coupled to the frame, as well as storage accessible to the processor and bearing instructions executable to receive input from the camera and identify, based on input from the camera, the first liquid crystal unit to control for permitting light to pass through the at least one lens. The instructions are also executable to control the first liquid crystal unit to permit a first amount of light to pass through the lens.

19 Claims, 6 Drawing Sheets

EYE GLASSES WITH POLARIZERS FOR CONTROLLING LIGHT PASSING THROUGH AT LEAST ONE LENS OF THE EYE GLASSES

FIELD

The present application relates generally to eye glasses with polarizers for controlling light passing through at least one lens of the eye glasses.

BACKGROUND

As recognized herein, wearing conventional sunglasses can be beneficial to a user since they may protect the user's eyes from the sun's harmful ultraviolet rays. However, conventional sunglasses can also make it difficult to see other objects within the user's field of view under such conditions, such as a vehicle's on board display. There are currently no adequate ways to remedy the foregoing problem.

SUMMARY

Accordingly, in one aspect eye glasses include a frame, a processor coupled to the frame, and at least one lens accessible to the processor and coupled to the frame. The lens includes first and second polarizers and a first liquid crystal unit juxtaposed between the first and second polarizers, with the at least one lens comprising plural liquid crystal units controllable by the processor. The eye glasses also include at least a first camera accessible to the processor and coupled to the frame, as well as storage accessible to the processor and bearing instructions executable by the processor. The instructions are executable by the processor to receive input from the first camera and identify, based on input from the first camera, at least the first liquid crystal unit to control for permitting light to pass through the at least one lens. The instructions are also executable by the processor to control at least the first liquid crystal unit to permit a first amount of light to pass through the at least one lens.

In another aspect, a method includes receiving input from a first camera disposed on a pair of glasses and controlling, based on the input from the first camera, a mechanism on the glasses to permit a first amount of light to pass through at least a first portion of at least one lens of the glasses.

In still another aspect, a computer readable storage medium (CRSM) that is not a transitory signal includes instructions executable by a processor to receive input from a first camera disposed on a pair of glasses. The instructions are also executable by the processor to control, based on the input from the first camera, at least a portion of a lens on the pair of glasses to permit a first amount of light to pass through at least the portion of the lens. The lens includes plural liquid crystal units actuatable for permitting light to pass therethrough.

The details of present principles, both as to their structure and operation, can best be understood in reference to the accompanying drawings, in which like reference numerals refer to like parts, and in which:

DETAILED DESCRIPTION

Disclosed herein are systems and methods to adjust the amount of "tint" at various portions of lenses of electronic glasses so that, for instance, a region of interest may be optimally viewed. For example, for a user looking at the dashboard of a vehicle in bright sunlight while wearing the glasses, the glasses may make the windshield appear darkened (e.g., to contain the amount of relative overexposure) while the glasses may make the area of the dashboard appear brighter when it would otherwise appear darker if not wearing the glasses.

Multi-layer polarization technology may be used in accordance with present principles to adjust the polarization angle within a region of the lenses to allow for anti-glare on the windshield, while changing the angle to allow easier viewing of LCD displays on the dash at the same time out of another portion of the lenses than would be used to view the windshield. Eye tracking and field of view cameras may be leveraged for such purposes. Thus, using eye tracking, the appearance of the brightness of the LCD display as viewed through the lenses may be kept steady as the user moves his head (and/or eyes) while wearing the glasses by refreshing the multi-layer polarization lenses multiple times a second so that the brightness appears the same for various items in the field of view despite user movement or jostling of the glasses. Additionally, in some embodiments where there are areas in the user's field of view of different brightnesses, the glasses may identify the object that the user is focusing on (e.g., using eye tracking and object recognition), and average the exposure for other areas that the user is not focused on so that the other areas do not appear overly-bright and distracting.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system;

hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

Figure 1:
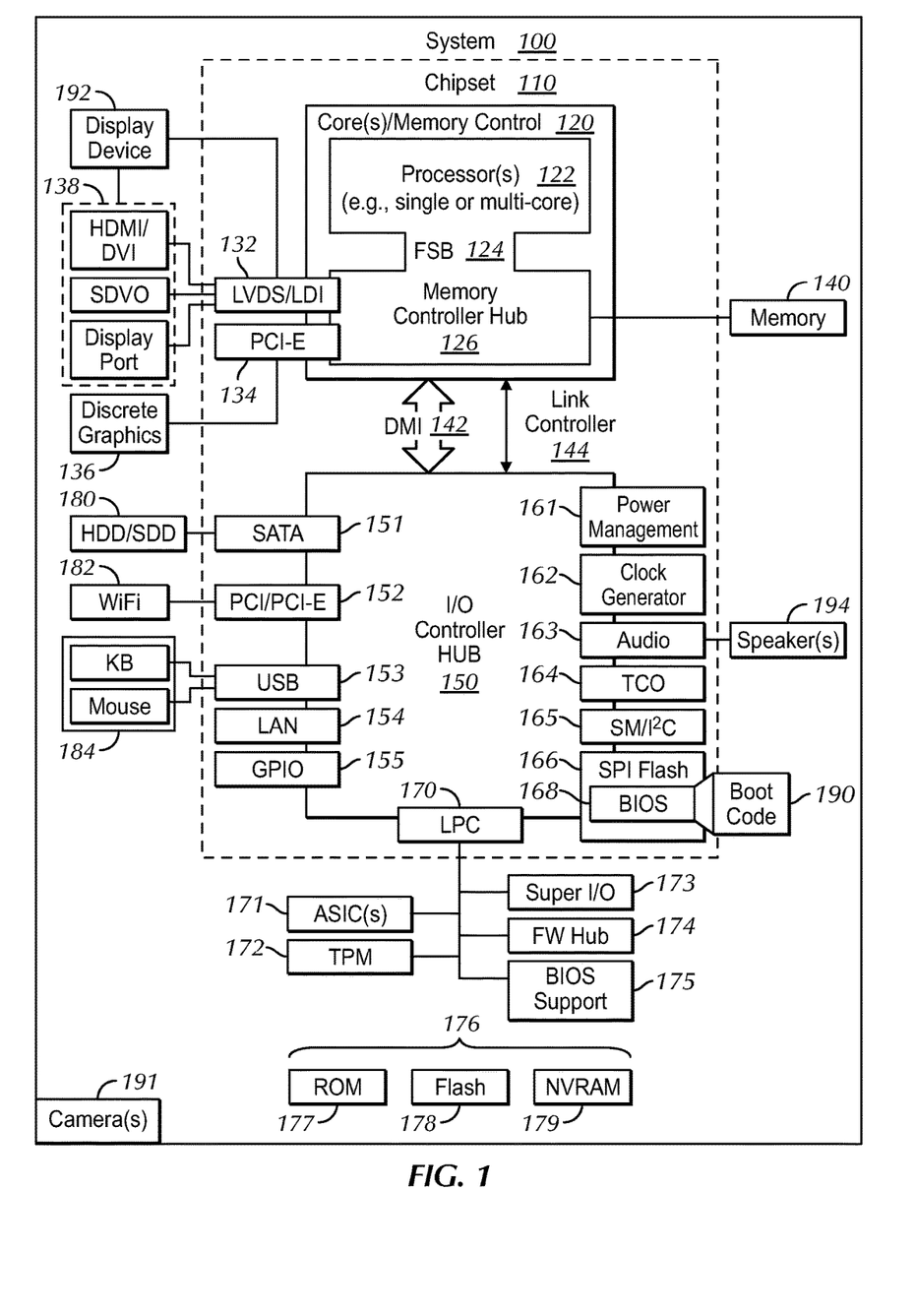
FIG. 1 is a block diagram of an example system in accordance with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

FIG. 1 also shows that the system 100 includes at least one and optionally plural cameras 191 for gathering one or more images and providing input related thereto to the processor 122. The cameras 191 may be, e.g., thermal imaging cameras, digital cameras such as webcams, and/or cameras integrated into the system 100 and controllable by the processor 122 to gather pictures/images and/or video such as of a user's face and eyes (and/or eye movement, focus and/or focal length, etc.).

Additionally, though not shown for clarity, in some embodiments the system 100 may include a gyroscope that senses and/or measures the orientation of the system 100 and provides input related thereto to the processor 122, an accelerometer that senses acceleration and/or movement of the system 100 and provides input related thereto to the processor 122, and an audio receiver/microphone that provides input from the microphone to the processor 122 based on audio that is detected, such as via a user providing audible input to the microphone. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
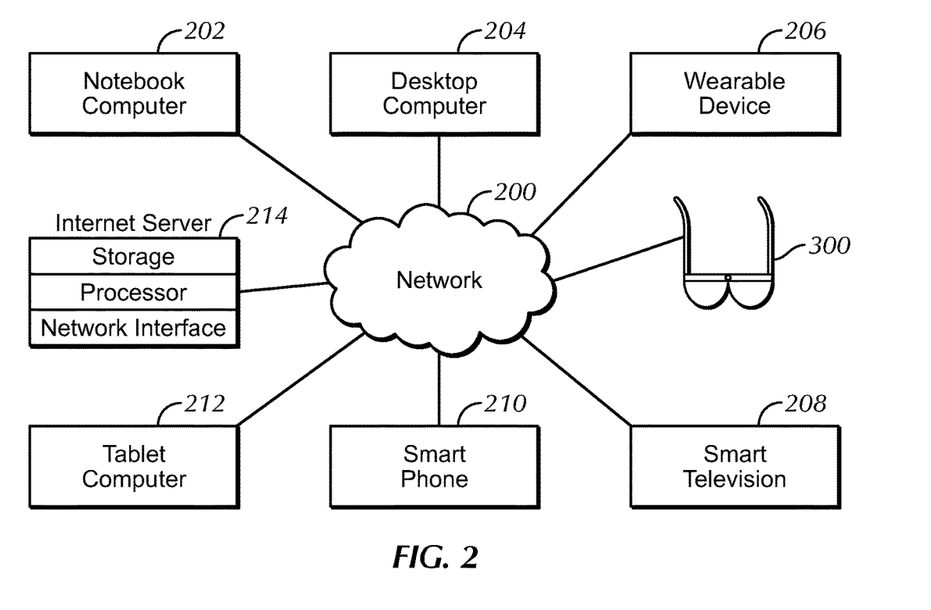
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, electronic glasses 300, and a server 214 such as an Internet server that may provide cloud storage accessible to the devices 202-212, 300. It is to be understood that the devices 202-214 and 300 are configured to communicate with each other over the network 200 to undertake present principles.

Figure 3:
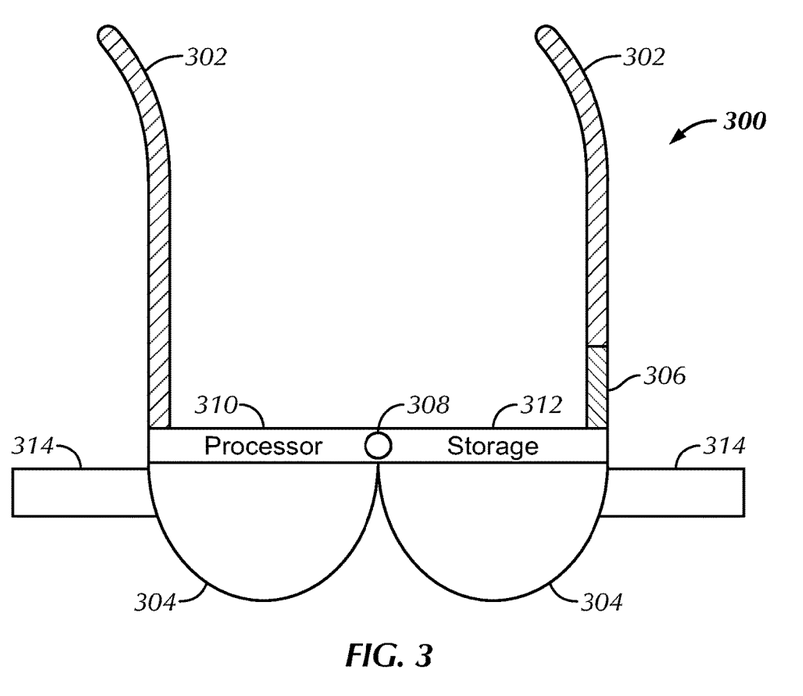
FIG. 3 is a perspective view of example eye glasses in accordance with present principles.

Now referring to FIG. 3, it shows a perspective view of the example electronic eye glasses 300 that may be used in accordance with present principles, it being understood that the system 100 may be, e.g., embodied in the glasses 300 and accordingly the glasses 300 may include some or all of the elements of the system 100 discussed above. In any case, the glasses 300 include a frame 302 which may include elongated arms for positioning over the ears of a person. The glasses 300 may further include a center portion between the elongated arms at respective first ends of the arms to connect the arms and to engage one or more lenses and other components of the glasses 300 to be described below.

Thus, the glasses 300 include one or more at least partially transparent lenses 304 through which a user may view objects in the user's line of sight when the glasses 300 are worn on his or her face. The at least partially transparent lenses 304 may include polarizers and plural liquid crystal units (LCUs) juxtaposed between the polarizers. Components of the lenses 304 will be discussed in greater detail in reference to FIG. 4.

In addition to the foregoing, the glasses 300 may also include power source 306 such as a battery that powers the other components of the glasses 300 described herein. The glasses 300 further include a first camera 308 positioned on the glasses to provide images corresponding to the field of view the user would have when wearing the glasses 300 and looking outward therefrom through the lenses 304. Additionally, the glasses 300 include a processor 310 that may control the liquid crystal units of the lenses 304 described above, as well as storage 312 accessible to the processor 310 and storing data such as instructions executable by the processor 310 to undertake present principles.

Still in reference to FIG. 3, the glasses 300 may further include one or more additional cameras 314 (e.g., digital cameras) that are oriented on the glasses 300 for gathering images of the user's guys (e.g., and specifically their pupils) when wearing the glasses 300 so that the glasses 300 can track movement of the user's eyes and the direction of the user's gaze while the user wears the glasses. Thus, using eye tracking principles and/or software, the processor 310 may determine which direction and/or to which objects the user is looking, as well as determine the depth of the user's focus in accordance with present principles.

Though not shown for clarity, in some embodiments the glasses 300 may also include other components such as RAM and a network interface for communication over at least one network such as the Internet, a WAN, a LAN, etc. under direction of the processor(s) 310 with another device.

Figure 4:
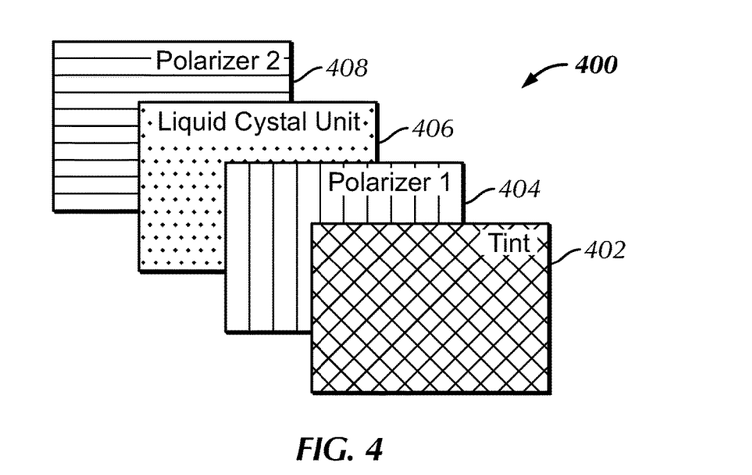
FIGS. 4 and 5 are diagrams of example mechanisms for lenses of the glasses in accordance with present principles.

Now in reference to FIG. 4, it shows one example of components/layers 402-408 that may establish a portion of the lenses 304 described above. Each of the components 402-408 may establish a respective layer of the lenses 304, with each layer shown in FIG. 4 as distanced from the other layers for illustration. It is to be understood that the lenses 304 may each be composed of hundreds if not thousands of sets of components similar to the set/mechanism 400 shown in FIG. 4. It is to also be understood that when assembled to form a portion of the lenses 304, the components 402-408 may be controllable between transparent and opaque configurations to permit or not permit light in the visible spectrum to pass therethrough.

Component 402 may be a layer of optical tint furthest from the user's eyes when the glasses are being worn. Component 404 may be a first polarizer/polarization filter permitting light to pass through it in a vertical plane. Component 406 may be a liquid crystal unit that is controllable by a processor of the glasses in accordance with present principles. Component 408 may be a second polarizer/polarization filter oriented ninety degrees relative to the first polarizer to permit light to pass through it in a horizontal plane.

Describing the liquid crystal unit 406 in more detail, it may be similar to liquid crystal pixel units used in liquid crystal displays and may include liquid crystals (e.g., twisted nematic liquid crystals) with horizontally etched glass on the back and vertically etched glass on the front. Transparent electrodes may be juxtaposed on the outside of the etched glass portions to thus leave the glass portions disposed between the electrodes located on the outside and liquid crystals located in the middle.

As light passes through the liquid crystal unit 406 when voltage is not applied to it, the light may follow the path of the liquid crystal molecules so that light traveling through the polarizer 404 along the vertical plane may exit the liquid crystals along the horizontal plane and through the polarizer 408 to reach the user's eye.

When voltage is applied via the electrodes to the liquid crystal molecules using a transistor under control of the glasses' processor, light traveling along the vertical plane from the polarizer 404 may also exit along the vertical plane and subsequently may get blocked by the polarizer 408. Furthermore, in some embodiments voltage may be varied so that as more voltage is applied, less light passes through the polarizer 408 and to the user than when relatively less voltage is applied since the liquid crystal molecules may untwist in proportion to the voltage applied and hence pass less light through to the user as voltage increases.

Figure 5:
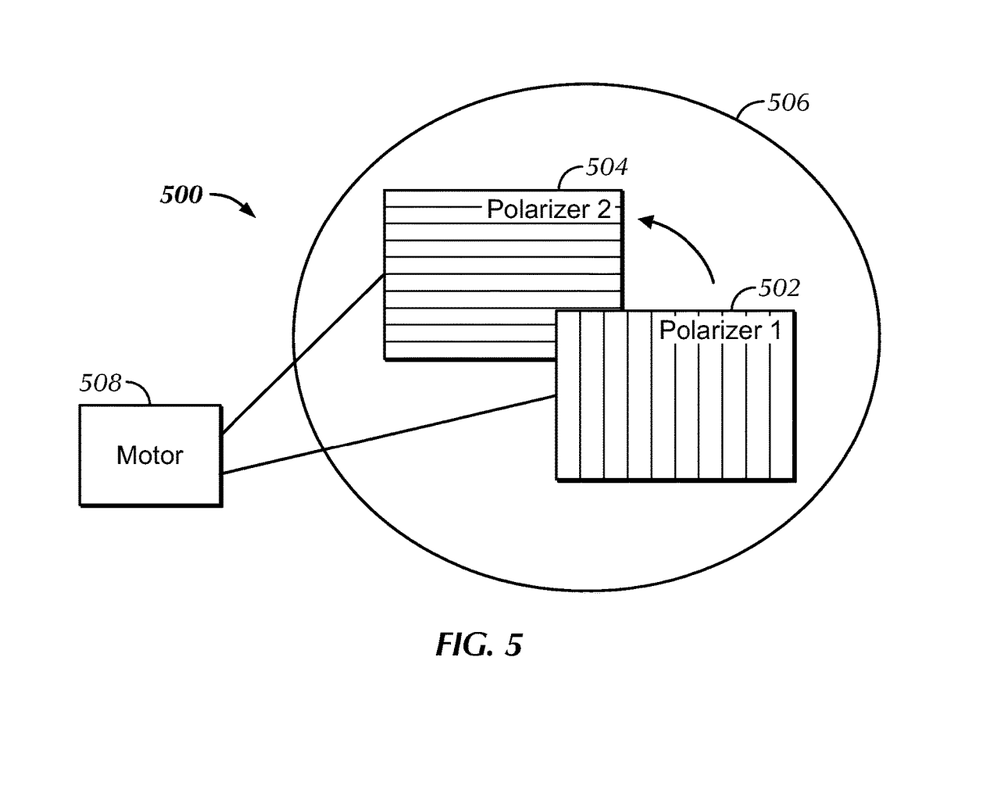

Moving on in the detailed description to FIG. 5, it shows an example of polarizer components/layers 502, 504 that may establish another embodiment for the lenses 304 described above. Each of the components 502, 504 may establish a respective layer of the lenses 304, with each layer shown in FIG. 5 as distanced from the other respective layer for illustration. It is to be understood that lenses of glasses using the embodiment of FIG. 5 may each be composed of hundreds if not thousands of sets of components similar to the set/mechanism 500 shown in FIG. 5.

As may be appreciated from FIG. 5, when assembled to form a portion of the lenses 304, the components 502, 504 may rotate and/or slide along a track 506 as driven by a motor 508 under control of the processor in the glasses. One or both polarizer components may thus be rotated along the track 506 so that the polarizers 502, 504 rotate between allowing light to pass in respective planes perpendicular to each other (as shown in FIG. 5) so that no light ultimately passes through to the user, and allowing light to pass in respective planes parallel to each other so that light does pass through to the user.

In addition to the components described above in reference to FIG. 5, the set/mechanism 500 may also include a layer of optical tint.

Either of the mechanisms 400 or 500 may be used in conjunction with what is disclosed herein. However, for convenience FIG. 6 will be described for glasses using the example liquid crystal mechanism from FIG. 4.

Figure 6:
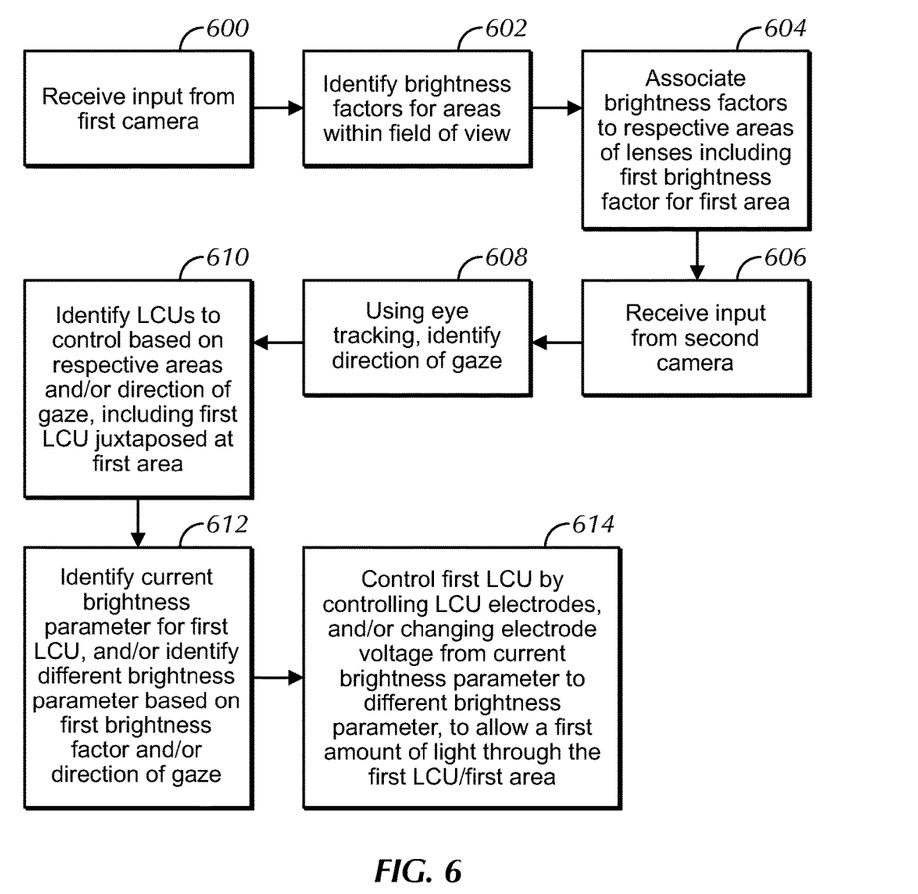
FIG. 6 is a flow chart of an example algorithm in accordance with present principles.

Now describing FIG. 6, it shows example logic that may be executed by electronic glasses in accordance with present principles. Beginning at block 600, the logic may receive input from a first camera disposed on the glasses, such as input from the camera 308 described above, that is imaging a field of view corresponding to the field of view of the user when wearing the glasses. The logic may then move to block 602 where the logic may, based on the input from the first camera, identify brightness factors for respective areas within the field of view. For example, at block 602 and using images from the first camera, the logic may identify regions within the field of view that are brighter than others and assign respective brightness amounts expressed as integers to each region to establish the brightness factors for the respective areas, with higher integers being associated with relatively more brightness.

From block 602 the logic may then move to block 604. At block 604 the logic may associate the brightness factors with respective areas of the lenses through which the respective areas of the field of view (for which the respective brightness factors have been assigned) would be observed using the lenses. The logic may do so, for instance, using a relational database accessible to the glasses that correlates pixels or sets of pixels for the camera/images with respective areas of the lenses corresponding to the pixels/sets of pixels so that brightness factors identified from respective pixels based on the input from the first camera may be associated with the respective areas of the lenses.

The first camera may also use a predetermined zoom amount for the correlation that corresponds to the user's field of view while using his or her naked eye or using prescription lenses. In doing so, brightness factors identified from various portions of the images from the first camera may accurately correspond to where the respective areas appear in the user's field of view while wearing the glasses. The glasses may thus assume the field of view of the first camera is the same as the field of view of the user when associating brightness factors with respective areas of the lenses, or the logic may take the field of view and apply respective predetermined offsets for the left and right eyes when associating brightness factors with respective areas of the lenses (as may be defined by the glasses' manufacturer). In any case, it is to be understood that at block 604 at least a first brightness factor is associated with at least a first area of one of the lenses (or a first area of a single lens if a single, unitary lens is used for viewing with both eyes).

From block 604 the logic may proceed to block 606. At block 606 the logic may receive input from one or more second cameras on the glasses imaging the user's eyes. From block 606 the logic may proceed to block 608 where the logic may, using eye tracking software, identify a direction of the user's gaze based on the input from the second camera(s).

From block 608 the logic may then proceed to block 610 where the logic may identify respective liquid crystal units (LCUs) to control that are juxtaposed on the lenses at the respective areas of the lenses for which brightness factors have been associated. Additionally or alternatively, the logic may identify respective LCUs to control based on the user's direction of gaze to thus control at least the LCUs on the lenses in the direction of the user's gaze. The LCUs may be identified at block 610 using a relational database accessible to the glasses that correlates LCUs or sets of LCUs with respective areas of the lenses at which the respective LCUs/sets of LCUs are juxtaposed. Thus, at block 610 at least a first LCU at the first area may be identified.

From block 610 the logic may move to block 612. At block 612 the logic may identify a current brightness parameter for the first LCU, such as an amount of voltage currently applied to the first LCU for permitting light to pass therethrough. Also at block 612, the logic may identify a different brightness parameter to use to control the first LCU, with the different brightness parameter being identified based on a first amount of light to be allowed to pass through the first LCU based on the first brightness factor and/or direction of the user's gaze. Thus, at block 612 the logic may identify a change in application of voltage to the first LCU to make, or simply identify a new voltage amount for application to the first LCU. In either case, the logic may then move to block 614 where the logic may control the first LCU by providing a given amount of electricity to the first LCU's electrodes and/or changing the first LCU's voltage to thus allow the first amount of light through.

It is to be understood that the new/different brightness parameter identified at block 612 may be identified based on the identified brightness factors from block 604. For instance, if brightness is to be equalized for the user's entire field of view through the glasses so that all portions appear uniform or similar in brightness, the first LCU may be controlled so that at least a portion of a bright spot in the user's field of view (such as the sun's reflections off a portion of an object) as viewed through the first LCU may be dimmed by allowing less light through the first LCU than may concurrently be allowed through a second LCU corresponding to a relatively less-bright area in the user's field of view. An illustration of this will be described below in reference to FIG. 7. In any case, it is to be further understood that in some embodiments various brightness factors may be correlated, in a relational database accessible to the glasses, to various respective amounts of voltage to apply for a given LCU so that all regions of the field of view may appear at a predetermined, uniform brightness level (e.g., with progressively higher brightness factors being correlated to progressively increasing voltage amounts).

The new/different brightness parameter may also be identified at block 612 based on the user's direction of gaze from block 608. For instance, the glasses may have a setting configured so that more light is permitted through the LCUs at lens areas corresponding to the user's current gaze direction while the LCUs of other areas of the lenses are controlled to allow less light through and hence those other portions of the field of view may appear more opaque than what is seen via the user's direction of focus. An illustration of this will be described below in reference to FIG. 8. In any case, it is to be further understood that object recognition, based on images from the camera imaging the user's field of view, may also be used to identify what the user is looking at and to control the LCUs accordingly so that the object appears at the same brightness level through time despite jostling of the glasses or movement of the user.

Figure 7:
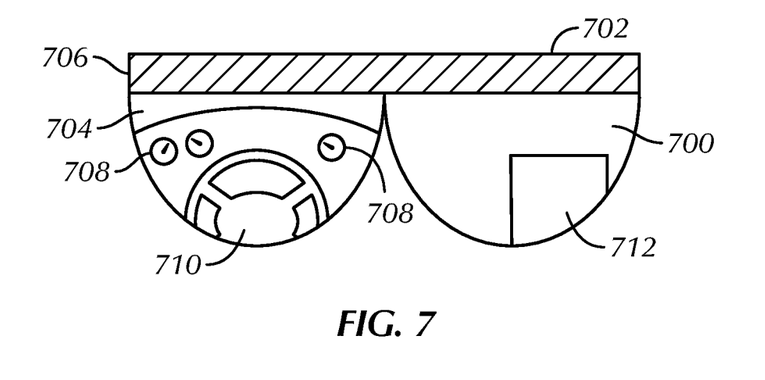
FIGS. 7 and 8 are example illustrations in accordance with present principles.

Now describing FIG. 7, it shows an illustration of a field of view 700 of the user as viewed through lenses 702 having LCUs and polarizers disposed thereon in accordance with present principles. It is to be understood that the field of view 700 is what the user sees while driving a vehicle, and accordingly the field of view 700 includes a dashboard area 704 of the vehicle and a windshield area 706 of the vehicle through which the user may view the road. Dashboard gauges 708 and a steering wheel 710 are also shown in the field of view, along with an on board vehicle display 712 at which digital images may be presented. Owing to the areas outside the vehicle being brighter due to direct sunlight than areas within the vehicle, the glasses may control the LCUs on the lenses 702 to lessen the apparent brightness of the windshield area 706 (as indicated by the shading in the windshield area 706 as shown) by letting less light through the LCUs corresponding to the windshield area 706 than is let through the LCUs corresponding to the other areas in the field of view, including the display 712.

Accordingly, had the user not been wearing the glasses but had tried to view content on the display 712, it might have been difficult to do so owing to the brightness from the windshield area 706 being so much brighter. However, when wearing the glasses, some of the light from the windshield area 706 may be blocked so that the user may be less distracted and more able to see the content on the display 712.

Figure 8:
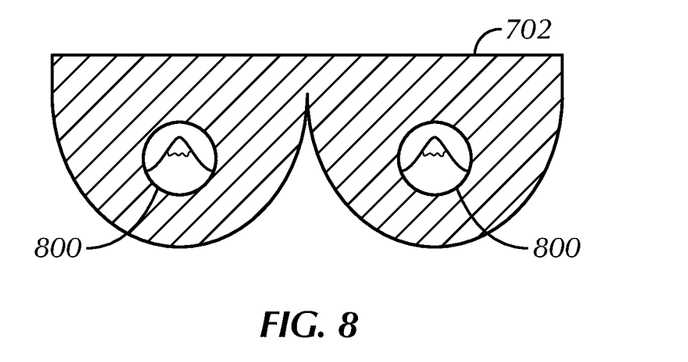

Now describing FIG. 8, it shows an illustration of a user's view through the lenses 702 while viewing a mountain range. In this example, the glasses have been configured to have a periscope effect where a mountain peak 800 in the line of sight of the user is clearly viewable using each eye, as represented by the peak 800 being viewable through two different portions of the lenses 702, one for each eye. Thus, in contrast to FIG. 7 where the field of view 700 was understood to be from the perspective of the user while looking through the lenses 702 while wearing the glasses, FIG. 8 shows the lenses 702 themselves.

As may be appreciated from FIG. 8, the lenses 702 have transparent and opaque portions at a given moment in time owing to the LCUs on the lenses 702 being controlled so that a circular area on each lenses 702 (one for each eye) corresponds to the direction of gaze from respective left and right eyes to allow the user to view the mountain peak 800 while other areas that would otherwise be in the user's field of view are dimmed or made opaque.

Figure 9:
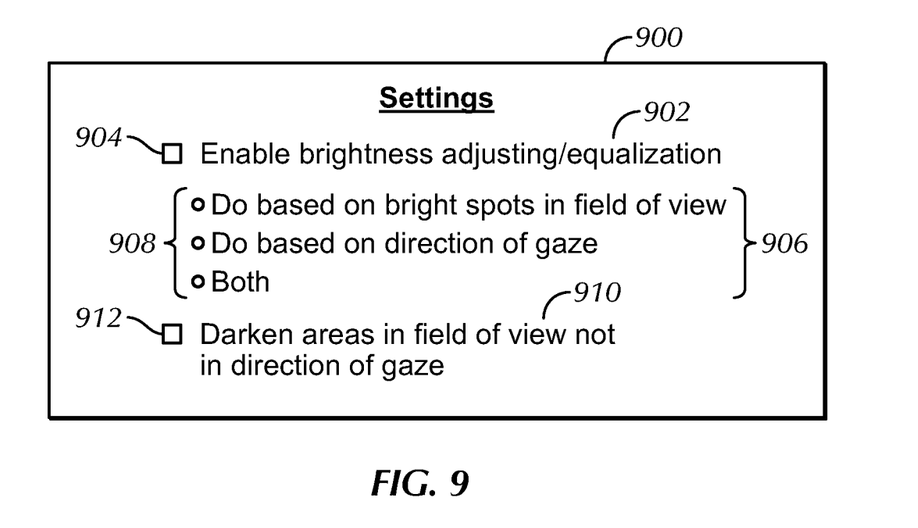
FIG. 9 is an example user interface (UI) in accordance with present principles.

Continuing the detailed description in reference to FIG. 9, it shows an example user interface (UI) 900 presentable on a display for configuring settings of a pair of electronic glasses in accordance with present principles. For instance, the UI 900 may be presentable on the display of a smart phone in Bluetooth communication with the glasses, and/or the UI 900 may be presented on the lenses of the glasses themselves if the lenses have "heads up" display capability as may be the case in some embodiments. Thus, the check boxes and radio buttons to be discussed below may be selected based on touch input, cursor input, eye input, voice input, etc.

The UI 900 may include a first option 902 selectable using the check box 904 to enable the glasses to undertake present principles, such as enabling the glasses to undertake the logic of FIG. 6 for brightness equalization so that what would otherwise be brighter areas in the user's field of view may be dimmed using some LCUs on the lenses while what would otherwise be less bright areas may be made to look brighter by controlling other LCUs on the lenses.

Sub-options 906 may also be respectively selected using the respective radio buttons 908 shown adjacent to each sub-option. The sub-options may be selected to enable the glasses to perform brightness equalization based on identified brightness amounts for various areas of the user's field of view so brighter areas appear less bright (e.g., so that bright areas appear more uniform in brightness to otherwise less bright areas), or to perform brightness equalization based on the direction of the user's gaze so that all other areas in the field of view appear at the same or a similar brightness level as what the user is viewing in the direction of his or her gaze. A third sub-option for enabling the glasses to perform brightness equalization based on both bright areas and the direction of the user's gaze may also be selected, as shown in FIG. 9.

The settings UI 900 may also include an option 910 selectable using check box 912. The option 910 may be selectable to configure the glasses to darken areas in the field of view that are not in the direction of the user's gaze to, for example, create the periscope effect described in reference to FIG. 8.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. Eye glasses, comprising:
   at least one frame;
   at least one processor coupled to the frame;
   at least one lens accessible to the processor and coupled to the frame, the lens comprising first and second polarizers and a first liquid crystal unit juxtaposed between the first and second polarizers, the at least one lens comprising at least a first liquid crystal unit controllable by the processor;
   at least a first camera accessible to the processor and coupled to the frame; and
   storage that is not a transitory signal and that is accessible to the processor and comprising instructions executable by the processor to:
   receive input from the first camera;
   identify, based on input from the first camera, at least the first liquid crystal unit to control for permitting light to pass through the at least one lens; and
   control at least the first liquid crystal unit to permit a first amount of light to pass through the at least one lens.

2. The eye glasses of claim 1, wherein the instructions are executable by the processor to:
   identify, based on input from the first camera, a first brightness factor for a first area of the lens; and
   identify at least the first liquid crystal unit to control based on the first brightness factor.

3. The eye glasses of claim 2, wherein the first liquid crystal unit is juxtaposed at the first area, and wherein the instructions are executable by the processor to:
   identify a current brightness parameter for the first liquid crystal unit; and
   control, based on the first brightness factor, at least the first liquid crystal unit to change the current brightness parameter to a different brightness parameter to allow the first amount of light through the first area of the lens.

4. The eye glasses of claim 3, wherein the current and different brightness parameters pertain to voltage applied to the first liquid crystal unit.

5. The eye glasses of claim 1, comprising a tinted layer on at least a portion of the lens.

6. The eye glasses of claim 1, comprising a battery, wherein the battery powers the processor, the first camera, and the first liquid crystal unit.

7. The eye glasses of claim 1, comprising a second camera accessible to the processor and coupled to the frame, the second camera coupled to the frame to image a person's eyes while the person wears the eye glasses.

8. The eye glasses of claim 7, wherein the instructions are executable by the processor to:
   identify, based on input from the second camera, a direction of gaze of the person while the person wears the eye glasses; and
   control, based on the direction of gaze, at least the first liquid crystal unit to permit the first amount of light to pass through the at least one lens.

9. The eye glasses of claim 1, wherein the instructions are executable by the processor to:
   identify, based on input from the first camera, a direction of gaze of a person while the person wears the eye glasses; and
   control, based on the direction of gaze and identification of at least the first liquid crystal unit, at least the first liquid crystal unit to permit the first amount of light to pass through the at least one lens.

10. A method, comprising:
    receiving input from a first camera disposed on a pair of glasses;
    controlling, based on the input from the first camera, a mechanism on the glasses to permit a first amount of light to pass through at least a first portion of at least one lens of the glasses;
    identifying a second amount of light currently able to pass through at least the first portion of the at least one lens;
    controlling, based on the second amount of light and based on the input from the first camera, the mechanism to permit the first amount of light to pass through at least the first portion of the one lens, the second amount of light being different from the first amount of light.

11. The method of claim 10, comprising:
    identifying, based on input from the first camera, at least a first liquid crystal unit of plural liquid crystal units disposed on the glasses to control for permitting light to pass through the at least one lens; and
    controlling the mechanism on the glasses to permit the first amount of light to pass through at least the first portion of the at least one lens, the mechanism comprising the first liquid crystal unit.

12. The method of claim 10, comprising:
presenting a user interface on a display, the UI comprising an option selectable to enable controlling, based on input from the first camera, of the mechanism on the glasses.

13. The method of claim 10, comprising:
identifying, based on input from the first camera, a direction of gaze of a person while the person wears the glasses; and
controlling, based on the direction of gaze, the mechanism on the glasses to permit the first amount of light to pass through at least the first portion of the at least one lens of the glasses.

14. The method of claim 10, comprising:
identifying, based on input from the first camera, at least a first area in the field of view of the first camera from which more light emanates than from a second area in the field of view; and
controlling, based on the first area, the mechanism on the glasses to permit the first amount of light to pass through at least the first portion of the at least one lens of the glasses.

15. A method, comprising:
receiving input from a first camera disposed on a pair of glasses;
controlling, based on the input from the first camera, a mechanism on the glasses to permit a first amount of light to pass through at least a first portion of at least one lens of the glasses, wherein the mechanism comprises first and second polarizers, the method comprising:
controlling the mechanism by altering the position of the first polarizer with respect to the position of the second polarizer.

16. A computer readable storage medium (CRSM) that is not a transitory signal, the computer readable storage medium comprising instructions executable by a processor to:
receive input from a first camera disposed on a pair of glasses;
control, based on the input from the first camera, at least a portion of a lens on the pair of glasses to permit a first amount of light to pass through at least the portion of the lens, the lens comprising plural liquid crystal units actuatable for permitting light to pass therethrough.

17. The CRSM of claim 16, wherein the instructions are executable by the processor to:
identify, based on input from the first camera, at least a first area in the field of view of the first camera that appears brighter than a second area in the field of view; and
control, based on identification of the first area, at least the portion of a lens to actuate a first liquid crystal unit of the plural liquid crystal units to permit the first amount of light to pass through at least the portion of the lens.

18. The CRSM of claim 17, wherein the instructions are executable by the processor to:
identify, based on input from a second camera disposed on the pair of glasses, a direction of a person's gaze while wearing the pair of glasses; and
control, based on identification of the first area and based on identification of the direction, at least the portion f a lens to actuate the first liquid crystal unit o permit the first amount of light to pass through at least the portion of the lens.

19. The CRSM of claim 16, wherein the instructions are executable by the processor to:
control at least the portion of the lens to permit the first amount of light to pass through at least the portion of the lens by altering voltage applied to at least a first liquid crystal unit of the plural liquid crystal units.

* * * * *